US012779777B2

(12) United States Patent
Discekici et al.

(10) Patent No.: US 12,779,777 B2
(45) Date of Patent: Nov. 3, 2026

(54) THREE-DIMENSIONAL PRINTING WITH POST-PRINT THERMAL TREATMENT

(71) Applicant: PERIDOT PRINT LLC, Palo Alto, CA (US)

(72) Inventors: Emre Hiro Discekici, San Diego, CA (US); Geoffrey Schmid, San Diego, CA (US); Alay Yemane, San Diego, CA (US)

(73) Assignee: Peridot Print LLC, Palo Alto, CA (US)

(*) Notice: Subject to any disclaimer, the term of this patent is extended or adjusted under 35 U.S.C. 154(b) by 140 days.

(21) Appl. No.: 18/289,556

(22) PCT Filed: May 10, 2021

(86) PCT No.: PCT/US2021/031525
§ 371 (c)(1),
(2) Date: Nov. 3, 2023

(87) PCT Pub. No.: WO2022/240386
PCT Pub. Date: Nov. 17, 2022

(65) Prior Publication Data
US 2024/0246288 A1 Jul. 25, 2024

(51) Int. Cl.
*B29C 64/165* (2017.01)
*B29C 64/188* (2017.01)
(Continued)

(52) U.S. Cl.
CPC .......... *B29C 64/165* (2017.08); *B29C 64/188* (2017.08); *B29C 64/264* (2017.08);
(Continued)

(58) Field of Classification Search
CPC ... B29C 64/165; B29C 64/188; B29C 64/264; B29C 71/02; B33Y 10/00; B33Y 30/00; B33Y 40/20
See application file for complete search history.

(56) References Cited

U.S. PATENT DOCUMENTS

2016/0096324 A1 4/2016 Giller
2018/0272601 A1* 9/2018 Erickson .............. B29C 64/227
(Continued)

FOREIGN PATENT DOCUMENTS

CN 108698321 A 10/2018
DE 102013009749 A1 12/2014
(Continued)

*Primary Examiner* — Michael M. Robinson
(74) *Attorney, Agent, or Firm* — Dierker & Kavanaugh, P.C.

(57) ABSTRACT

A three-dimensional printing system can include a build material including from about 95 wt % to 100 wt % of thermoplastic elastomer particles having a D50 particle size from about 2 μm to about 150 μm, and a printhead fluidly coupled to or fluidly coupleable to a fusing agent to selectively and iteratively eject the fusing agent onto successive placed individual layers thereof. The fusing agent can include water and a radiation absorber. The three-dimensional printing system can also include a radiant energy source positioned to expose the individual layers of the build material to radiation energy to selectively fuse the thermoplastic elastomer particles in contact with the radiation absorber to iteratively form a three-dimensional object including multiple layers of fused thermoplastic elastomer, and a heating device to heat the three-dimensional object to a temperature sufficient that layer-to-layer fusion at an interior location of the three-dimensional object is enhanced.

6 Claims, 6 Drawing Sheets

(51) Int. Cl.

| | |
|---|---|
| ***B29C 64/264*** | (2017.01) |
| ***B29C 71/02*** | (2006.01) |
| ***B29K 21/00*** | (2006.01) |
| ***B33Y 10/00*** | (2015.01) |
| ***B33Y 30/00*** | (2015.01) |
| ***B33Y 40/20*** | (2020.01) |

(52) U.S. Cl.

CPC .............. *B29C 71/02* (2013.01); *B33Y 10/00* (2014.12); *B33Y 30/00* (2014.12); *B33Y 40/20* (2020.01); *B29C 2071/022* (2013.01); *B29K 2021/003* (2013.01); *B29K 2995/0094* (2013.01)

(56) References Cited

U.S. PATENT DOCUMENTS

| | | | | |
|---|---|---|---|---|
| 2018/0345576 | A1 | 12/2018 | Constantinou et al. | |
| 2019/0039295 | A1* | 2/2019 | Feng | C08K 3/04 |
| 2019/0039434 | A1 | 2/2019 | Wallace et al. | |
| 2020/0254520 | A1* | 8/2020 | Ugarte | B29C 64/194 |
| 2021/0046710 | A1* | 2/2021 | Koopmans | B33Y 10/00 |
| 2021/0291440 | A1* | 9/2021 | Fleischmann | B33Y 30/00 |
| 2022/0048244 | A1* | 2/2022 | Van Benthem | B29C 64/165 |
| 2022/0105679 | A1* | 4/2022 | Tandy | B29C 64/165 |

FOREIGN PATENT DOCUMENTS

| | | | | |
|---|---|---|---|---|
| DE | 102014115377 | A1 | 4/2015 | |
| DE | 102018118524 | A1 | 2/2019 | |
| RU | 2730485 | C1 | 8/2020 | |
| WO | 2020/085912 | A1 | 4/2020 | |
| WO | WO-2020251541 | A1 * | 12/2020 | B29C 64/30 |
| WO | 2021/010990 | A1 | 1/2021 | |
| WO | 2021/010992 | A1 | 1/2021 | |

* cited by examiner

THREE-DIMENSIONAL PRINTING WITH POST-PRINT THERMAL TREATMENT

BACKGROUND

Three-dimensional (3D) printing may be an additive printing process used to make three-dimensional solid parts from a digital model. Three-dimensional printing is often used in rapid product prototyping, mold generation, mold master generation, and short run manufacturing. Some three-dimensional printing techniques can be considered additive processes because they involve the application of successive layers of material. This can be unlike other machining processes, which often rely upon the removal of material to create the final part. Some three-dimensional printing methods can use chemical binders or adhesives to bind build materials together. Other three-dimensional printing methods involve partial sintering, melting, etc. of the build material. For some materials, partial melting may be accomplished using heat-assisted extrusion, and for some other materials curing or fusing may be accomplished using, for example, ultra-violet light or infrared light.

DETAILED DESCRIPTION

Figure 1:
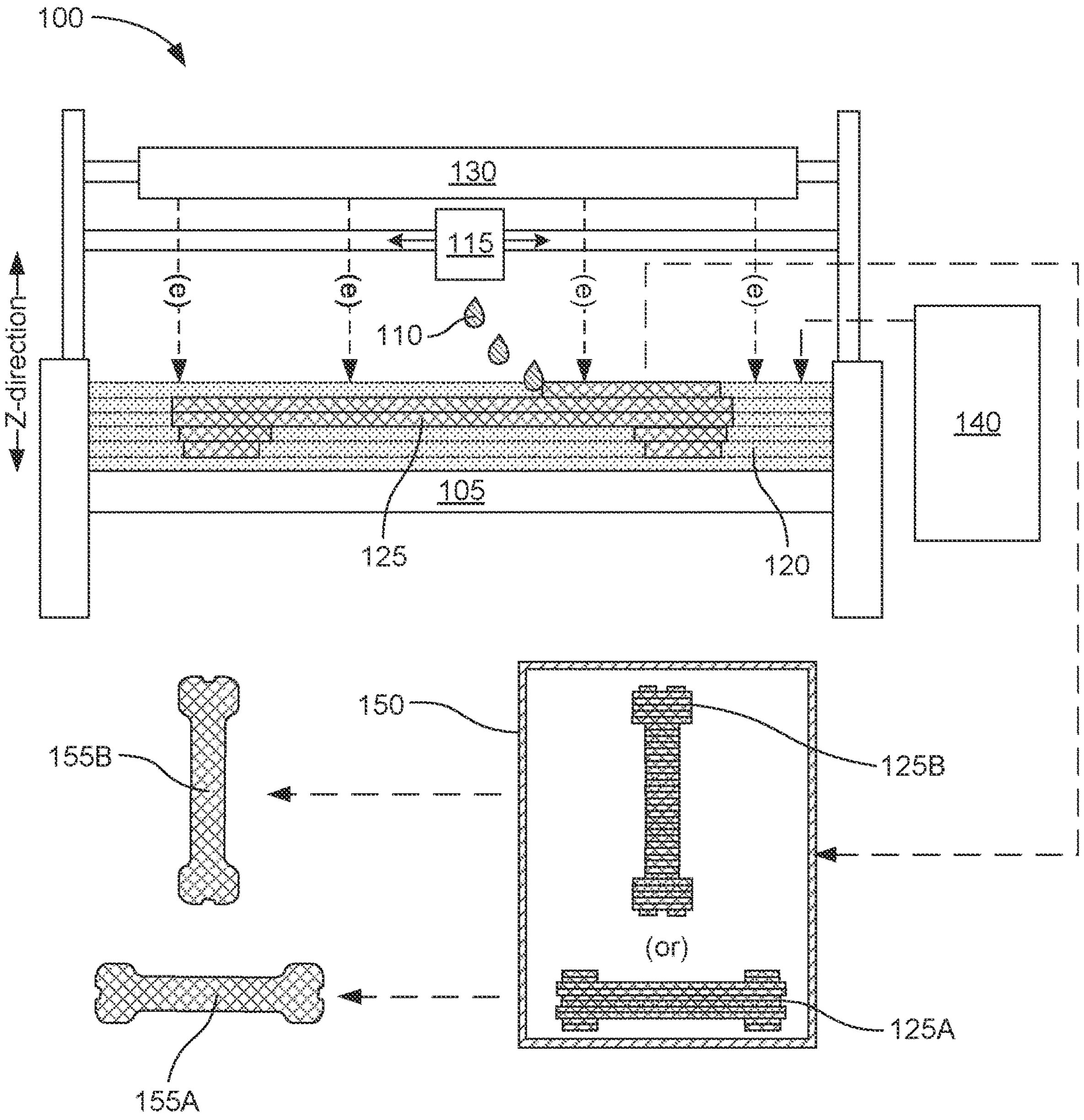
FIG. 1 is a schematic illustration of an example three-dimensional printing system and a three-dimensional object prepared in accordance with the present disclosure.

Three-dimensional printing can be an additive process involving the application of successive layers of a build material with a fusing agent printed thereon to bind the successive layers of the build material together. More specifically, a fusing agent including a radiation absorber can be selectively applied to a layer of a build material on a support bed, e.g., a build platform supporting build material, to pattern a selected region of a layer of the build material. The layer of the build material can be exposed to electromagnetic radiation, and due to the presence of the radiation absorber on the printed portions, the absorbed light energy at a portion of the layer having the fusing agent printed thereon can be converted to thermal energy, causing that portion to melt or coalesce, while other portions of the build material do not melt or coalesce. This can then be repeated to form the three-dimensional object. Three-dimensional objects printed from polymer build materials can suffer from mechanical issues, particularly in the Z-direction or orientation (the direction of layer-to-layer build). Specifically, three-dimensional objects can have reduced Young's Modulus, tensile strength, and strain at break in the Z-direction compared to those same mechanical properties measured in the X- and Y-directions (the lateral directions of individual build layers). This relative weakness in the Z-direction of the three-dimensional printed part can be in part due to changes in the thermal environment and fusing behavior of the materials, resulting sometimes in diminished layer coalescence compared to parts printed in the X- and Y-directions. This Z-direction mechanical property concern can sometimes be further exacerbated when using print modes with somewhat high layer thicknesses, e.g., greater than about 180 μm, compared to other print modes that utilize thinner layers of polymer build material, e.g., from about 50 μm to less than about 180 μm, or from about 70 μm to about 120 μm. By using post-print thermal treatment, e.g., facile yet controlled post-print annealing process, three-dimensional printed objects, including some that include thicker individual layers, can be treated in effect as pseudo "green parts" that can be annealed to enhance the mechanical integrity of the three-dimensional object, even in the Z-direction. In some instances, post-print thermal treatment can be carried out to achieve maximum (or near maximum) mechanical properties that may be on par with those measured in the X- and Y-directions. Since print modes utilizing thinner individual polymer build material layers do not typically have this mechanical strength issue in the Z-direction relative to the X- and Y-directions, this post-print thermal treatment can be particularly helpful. When utilizing the post-print thermal treatment in accordance with the present disclosure, in some instances, the three-dimensional printed part may not even exhibit signs of oxidative degradation, despite exposure to additional elevated temperatures at a later point in time.

In accordance with this, a three-dimensional printing system can include a build material including from about 95 wt % to 100 wt % of thermoplastic elastomer particles having a D50 particle size from about 2 μm to about 150 μm, and a printhead fluidly coupled to or fluidly coupleable to a fusing agent to selectively and iteratively eject the fusing agent onto successive placed individual layers of the build material. The fusing agent can include water and a radiation absorber. The three-dimensional printing system can also include a radiant energy source positioned to expose the individual layers of the build material to radiation energy to selectively fuse the thermoplastic elastomer particles in contact with the radiation absorber to iteratively form a three-dimensional object including multiple layers of fused thermoplastic elastomer, and a heating device to thermally treat the three-dimensional object to at a temperature sufficient that layer-to-layer fusion at an interior location of the three-dimensional object is enhanced. In one example, the heating device can be an annealing oven. The thermoplastic elastomer particles can include, for example, styrenic block copolymer (TPS), thermoplastic polyolefinelastomers (TPO), thermoplastic vulcanizate (TPV), thermoplastic polyurethane (TPU), thermoplastic copolyester (TPC), thermoplastic polyamide (TPA), or a mixture thereof. The build material can be devoid of polymer other than the thermoplastic elastomer particles. The radiation absorber can include metal dithiolene complex, carbon black, glass fiber, titanium dioxide, clay, mica, talc, barium sulfate, calcium carbonate, near-infrared absorbing dye, near-infrared absorbing pigment, metal nanoparticles, conjugated polymer, or a combination thereof.

In another example, a method of three-dimensional printing can include iteratively applying individual build material layers of a build material including from about 95 wt % to 100 wt % of thermoplastic elastomer particles having a D50 particle size ranging from about 2 μm to about 150 μm, and based on a 3D object model, iteratively and selectively dispensing a fusing agent onto individual build material layers, wherein the fusing agent comprises water and a radiation absorber. The method can also include iteratively exposing a powder bed to energy to selectively fuse the thermoplastic elastomer particles in contact with the radiation absorber and form a fused polymer matrix at the individual build material layers resulting in a fused three-dimensional object, and thermally treating the fused three-dimensional object at a temperature sufficient that layer-to-layer fusion at an interior location of the three-dimensional object is enhanced. In one example, the temperature can be within a range from about +/−40° C. of a melting point of the thermoplastic elastomer. The method can further include removing the three-dimensional object from the powder bed prior to thermal treatment. In this example, the post-print thermal treatment may include annealing the three-dimensional object in an annealing oven. The thermoplastic elastomer particles can include styrenic block copolymer (TPS), thermoplastic polyolefin elastomers (TPO), thermoplastic vulcanizate (TPV), thermoplastic polyurethane (TPU), thermoplastic copolyester (TPC), thermoplastic polyamide (TPA), or a mixture thereof. The fused three-dimensional object after thermally treating and cooling to room temperature compared to the fused three-dimensional object prior to thermal treatment may result in an enhanced layer-to-layer mechanical property in the Z-direction. The enhanced mechanical property in the Z-direction can provide from about 70% to about 200% strain at break, from about 6 MPa to about 12 MPa tensile strength, from about 30 MPa to about 70 MPa Young's Modulus, or a combination thereof, for example. The method can also include applying the individual build material layers to form a plurality or all of the individual build material layers of the thermoplastic elastomer particles at a layer thickness from about 180 μm to about 400 μm.

In another example, a three-dimensional printed object can include multiple fused layers of from about 95 wt % to about 99.9 wt % thermoplastic elastomer and from about 0.1 wt % to about 3 wt % radiation absorber dispersed in the thermoplastic elastomer. A plurality or all of the multiple fused polymer layers can have, e.g., can be built from, layers with a thickness from about 180 μm to about 400 μm. The three-dimensional printed object can exhibit a mechanical property in a Z-direction that is within about 50% to about 120% of the mechanical property in the X-direction or Y-direction, wherein the mechanical property includes strain at break (%), tensile strength (MPa), or Young's modulus (MPa). The mechanical property in the Z-direction can provide from about 70% to about 200% strain at break, from about 6 MPa to about 12 MPa tensile strength, from about 30 MPa to about 70 MPa Young's Modulus, or a combination thereof. The three-dimensional object can, for example, include a lattice structure having from about a 10% to about a 40% part density by volume.

When discussing the three-dimensional printing system, method of three-dimensional printing, and/or the three-dimensional printed object herein, these discussions can be considered applicable to one another whether or not they are explicitly discussed in the context of that example. Thus, for example, when discussing a build material related to a three-dimensional printing system, such disclosure is also relevant to and directly supported in the context of the method of three-dimensional printing and/or the three-dimensional printed object, and vice versa.

Terms used herein will have the ordinary meaning in their technical field unless specified otherwise. In some instances, there are terms defined more specifically throughout the specification or included at the end of the present specification, and thus, these terms can have a meaning as described herein.

Three-Dimensional Printing Systems

A three-dimensional printing system 100 as illustrated by way of example in FIG. 1, can include a fusing agent 110, a build material 120, a fluid applicator 115 such as a printhead, and a radiant energy source 130 to emit electromagnetic energy (e). The fusing agent can include water (in some instances with additional liquid vehicle components, such as organic co-solvent(s), surfactants, etc.) and a radiation absorber. The build material can include from about 95 wt % to 100 wt % of thermoplastic elastomer particles having a D50 particle size from about 2 μm to about 150 μm. In one example, the build material can be applied from a build material supply 140 in layers on a build platform 105 (which in one specific example may be lowered about the distance of a thickness of material to correspond to an applied layer of build material, for example), or a previously applied layer of build material. The printhead can be fluidly coupled to or fluidly coupleable to the fusing agent to selectively and iteratively eject the fusing agent onto successively placed individual layers of the build material. The radiant energy source can be positioned to expose the individual layers of the build material to radiation energy to selectively fuse the thermoplastic elastomer particles in contact with the radiation absorber to iteratively form a three-dimensional object, showed in an initial stage where fused build material layers 125 are being formed. Upon building the three-dimensional object using the build material, the fusing agent, and the electromagnetic energy, the object can be removed from the unused build material (sometimes referred to as the powder bed), and placed in a heating device 150, which can be an annealing oven or can be another type of heating device, for example. In some examples, the heating device may be associated with the three-dimensional printed object while the object is still present in the powder bed, provided thermal treatment is in addition to that generated using the radiant energy source and heats the object to a temperature that does not add unfused powder to the three-dimensional object by additional melting.

Following the selective application of a fusing agent 110 to the build material 120, the build material can be exposed to energy (e) from the radiation source 130. The radiation source can be an infrared (IR) or near-infrared light source, such as IR or near-IR curing lamps, IR or near-IR light emitting diodes (LED), or lasers with the desirable IR or near-IR electromagnetic wavelengths, and can emit electromagnetic radiation having a wavelength ranging from about 400 nm to about 1 mm. In one example, the emitted electromagnetic radiation can have a wavelength that can range from about 400 nm to about 2 μm.

In further detail, the fluid applicator 115 can be a printhead or other digital fluid ejector, e.g., thermal or piezo jetting architecture. The fluid applicator, in an example, can be a fusing agent applicator that can be fluidly coupled or coupleable to the fusing agent to iteratively apply the fusing agent to the build material to form individually patterned object layers. The fluid applicator can be any type of apparatus capable of selectively dispensing the fusing agent. For example, the fluid applicator can be a fluid ejector or digital fluid ejector, such as an inkjet printhead, e.g., a piezo-electric printhead, a thermal printhead, a continuous printhead, etc. The fluid applicator could likewise be a sprayer, a dropper, or other similar structure for dispensing the fusing agent to the build material. In an example, the fluid applicator can be located on a carriage track, but could be supported by any of a number of structures. In yet another example, the printhead can include a motor and can be operable to move back and forth over the build material along a carriage when positioned over or adjacent to a powder bed of a build platform.

In an example, the three-dimensional printing system can further include a build platform 105 to support the build material. The build platform can support the build material 120 to form a powder bed, and can be positioned to permit application of the fusing agent from the printhead onto a layer of the build material. The build platform can be configured to drop in height, thus allowing for successive layers of build material to be applied by a supply and/or spreader. The build material can be layered in the build platform at a thickness that can range from about 5 μm to about 1 mm. In some examples, individual layers can have a relatively uniform thickness. In one example, a thickness of a layer of the build material can range from about 10 μm to about 500 μm, or from about 30 μm to about 200 μm.

Once the three-dimensional object 125 is formed in the powder bed, the object can be heated to a temperature sufficient so that the layer-to-layer fusion at an interior location of the three-dimensional object is enhanced. Thermal treatment can occur using a heating device 150, which is shown as a separate device, but could be integrated with the three-dimensional printer as described in further detail below. It is noted that the three-dimensional object is printed in a layer-by-layer manner in the powder bed. Thus, by "layer-to-layer" printing and then fusion, this refers to the Z-direction of printing where layers can become fused together, as shown in FIG. 1. For explanatory purposes, two different three-dimensional objects are shown in the heating device. A first three-dimensional object 125A is shown where the dog bone shape is printed in a horizontal orientation (similar to that shown being printed in the powder bed). A second three-dimensional object 125B is also shown by way of example illustrating that the orientation of the build can be in any direction that the three-dimensional printing system can accommodate. In this example, however, the dog bone-shaped three-dimensional objects are shown in this second orientation to illustrate how the Z-direction mechanical properties are tested. In other words, the XY-direction mechanical properties can be tested using the first three-dimensional object and the Z-direction mechanical properties can be tested using the identically shaped three-dimensional object, but which is printed in a manner suitable for testing the Z-direction three-dimensional object mechanical properties. Either way, after thermally treating the fused three-dimensional objects (125A, 125B), enhanced Z-direction three-dimensional properties can be obtained, as shown by the three-dimensional printed objects 155A, 155B that result after further heat fusing using the heating device. As a note, the term "XY-direction" can be interpreted as meaning the X-direction and/or the Y-direction. When conducting mechanical properties testing, such as pulling for strain at break, the direction of testing will be along the XY-plane, but is tested in a single direction, e.g., X-direction or Y-direction, depending on the axis in which the dog bone shape is aligned. Thus, the XY-direction simply refers to the mechanical properties in the appropriate direction that is perpendicular to the Z-direction.

As mentioned, the three-dimensionally printed object can be further heat fused to further cure or anneal the object after printing. This can have a dramatic impact on Z-direction mechanical properties. Further heat fusing can be accomplished in a number of ways. In some examples, the three-dimensionally printed object can be transferred to the heating device 150, which can be a curing or annealing oven, after formation and maintained at a curing or annealing temperature for a designated period of time, depending on the specific thermoplastic elastomer that is used, the dimensions of the three-dimensionally printed object, etc. In other examples, a component of the three-dimensional printer itself can be used to cure or anneal the three-dimensionally printed object. For example, the three-dimensionally printed object can be cured or annealed in a heated powder bed prior to removing the object from the powder bed, or the powder can be removed from the powder bed for thermal treatment. In still further detail, the heating device (as a separate unit or as part of the three-dimensional printer) can be an annealing device that heats the three-dimensional object, and in some cases, may also allow the three-dimensional object to cool (or partially cool). To provide more controlled cooling, an annealing oven can be particularly useful in some examples.

Regarding temperatures for post-print thermal treatment, heating can be performed at a temperature of from about 120° C. to about 240° C., from about 130° C. to about 200° C., or from about 140° C. to about 180° C.; however, this can depend on the polymeric powder being employed. For example, it is noted that the temperature used can generally be around the melting temperature of the thermoplastic elastomer, and in some cases can be lower than a melting temperature of the thermoplastic elastomer. In other examples, the temperature for thermal treatment can be within a range from about +/−40° C. of a differential relative to a melting point of the thermoplastic elastomer. In further detail, the temperature can be within a range from about −40° C. to about +20° C. of a differential, from about −40° C. to about 0° C. of a differential, from about −30° C. to about +20° C. of a differential, from about −20° C. to about +20° C. of a differential or from about −25 C to about −5 C of a differential relative to the melting temperature of the thermoplastic elastomer. As used herein, "melting temperature" refers to the "melt peak temperature" at which thermoplastic elastomer melts and transitions from a solid to a liquid. In some examples, the post-print thermal treatment, e.g., annealing, can be carried out, as mentioned, at a temperature as low as about 40° C. below the melting temperature, but can likewise occur within about 35° C., about 30° C., about 25° C., about 20° C., about 15° C., about 10° C. or about 5° C. below a melt peak temperature for the thermoplastic elastomer. As mentioned, thermal treatment can also occur above the melting temperature, provided the time period is not such that it changes the form of the three-dimensional printed object. As an example of heat fusing after preparation of the three-dimensional printed object in the three-dimensional printer or powder bed, fresh thermoplastic polyamide (TPA) powder can have a melting temperature from about 135° C. to about 210° C. Taking one example of TPA having a melting temperature of about 140° C., and using the ranges provided above, post-print thermal treatment can occur within a temperature range from about 100° C. to about 180° C., from about 100° C. to about 160° C., from about 100° C. to about 140° C., from about 110° C.

to about 160° C., from about 120° C. to about 160° C., from about 110° C. to about 150° C., or from about 115° C. to about 145° C., depending on the time of thermal treatment, the size of the object, and/or other factors. The post-print thermal treatment process can be used to enhance the mechanical properties of the three-dimensional printed object, which may be particularly noticeable in the Z-direction.

Time frames for post-print thermal treatment can be from about 5 minutes to about 48 hours, from about 15 minutes to about 4 hours, from about 30 minutes to about 2 hours, etc., at about the peak temperature. Thermal treatment can also include a gradual ramp up to the peak temperature taking from about 2 minutes to about 4 hours, from about 5 minutes to about 2 hours, or from about 15 minutes to about 1 hour. In some instances, the three-dimensional printed part can be removed immediately after thermal treatment, but in other instances, controlled cooling may be useful for a period of time from about 2 minutes to about 4 hours, from about 5 minutes to about 2 hours, or from about 15 minutes to about 1 hour, for example.

Thermal treatment of the three-dimensional printed object can, for example, alter a crystal structure of the thermoplastic elastomer without visible external changes to an exterior surface of the thermoplastic elastomer particles. In some examples, the thermal treatment can cause a melting peak to separate and form a bimodal or multi-modal melting peak that was not present prior to the thermal treatment.

In additional detail, the three-dimensional printing system may include other fluid agents (not shown), such as coloring agents, detailing agents, or the like. A detailing agent, for example, can include a detailing compound, which can be a compound that can reduce the temperature of the build material when applied thereto. In some examples, the detailing agent can be applied around edges of the application area of the fusing agent. This can prevent caking around the edges due to heat from the area where the fusing agent was applied. Alternatively or additionally, detailing agent can be applied in the same area where fusing agent was applied in order to control the temperature and prevent excessively high temperatures when the build material is fused. In further detail, coloring agent, for example, can be included in some instances and can be used to apply color to the three-dimensionally printed part, or can be added to the fusing agent to provide color to the printed part, or to provide a basis for the user to know where the fusing agent has been applied.

The build material may be packaged or co-packaged with the fusing agent, or can be packaged separately to be brought together by the user. Other fluid agents, e.g., coloring agent, detailing agent, or the like, can likewise be co-packaged with the fusing agent and/or build material in separate containers, and/or can be combined with the fusing agent at the time of printing, e.g., loaded together in a three-dimensional printing system.

Methods of Three-Dimensional Printing

Figure 2:
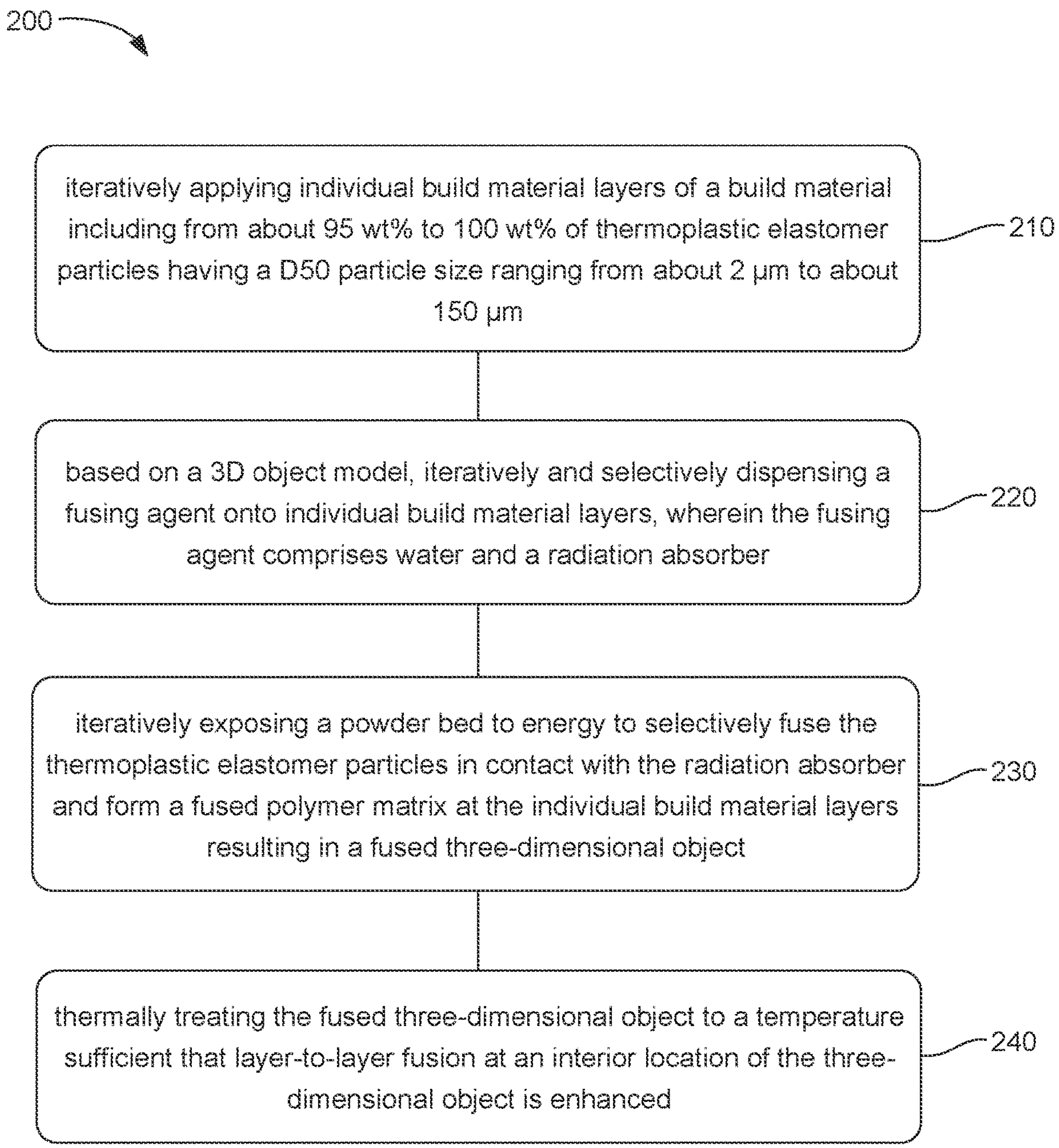
FIG. 2 is a flow diagram illustrating an example method of three-dimensional printing in accordance with the present disclosure.

A flow diagram of an example method 200 of three-dimensional (3D) printing is shown in FIG. 2. The method can include iteratively applying 210 individual build material layers of a build material including from about 95 wt % to 100 wt % of thermoplastic elastomer particles having a D50 particle size ranging from about 2 μm to about 150 μm, and based on a 3D object model, iteratively and selectively dispensing 220 a fusing agent onto individual build material layers, wherein the fusing agent comprises water and a radiation absorber. The method can also include iteratively exposing 230 a powder bed to energy to selectively fuse the thermoplastic elastomer particles in contact with the radiation absorber and form a fused polymer matrix at the individual build material layers resulting in a fused three-dimensional object, and thermally treating 240 the fused three-dimensional object to a temperature sufficient that layer-to-layer fusion at an interior location of the three-dimensional object is enhanced. As mentioned, in one example, the temperature for post-print thermal treatment can be within a range from about +/−40° C. of a melting point of the thermoplastic elastomer, with other sub-ranges also usable as outlined previously with respect to the three-dimensional printing system. The method can further include removing the three-dimensional object from the powder bed (notably, there is also heating that may occur during the build of the three-dimensional object, but this is not to be confused with the post-printing thermal treatment referred to here) and thermally treating the object by annealing in an annealing oven.

The fused three-dimensional object after thermal treatment (which may also include controlled cooling to room temperature) compared to the fused three-dimensional object prior to thermal treatment may result in an enhanced layer-to-layer mechanical property in the Z-direction. In some examples, the method can include applying the individual build material layers to from a plurality or even all of the individual build material layers of the thermoplastic elastomer particles at a layer thickness from about 180 μm to about 400 μm, from about 200 μm to about 350 μm, or from about 200 μm to about 300 μm. At a printing thickness greater than about 180 μm, and particularly greater than about 200 μm, Z-direction mechanical properties can be more significantly diminished, and thus, post-print thermal treatment can even more drastically improve the Z-direction mechanical properties of the three-dimensional printed article. The enhanced mechanical property in the Z-direction can provide, for example, from about 70% to about 200% strain at break, from about 70% to about 120% strain at break, from about 70% to about 100% strain at break, or from about 80% to about 100% strain at break. Strain at break refers to amount of stretch that the printed object can undergo before it breaks. A 100% strain at break would indicate that the three-dimensional object can be stretched to 100% beyond its original length before it breaks (or a 2× stretch prior to breaking). The enhanced mechanical property in the Z-direction can likewise provide from about 6 MPa to about 12 MPa tensile strength, from about 7 MPa to about 12 MPa, or from about 8 MPa to about 12 MPa tensile strength. These values can be similar to the tensile strength values often achievable in the XY-direction. Elongation at break and tensile strength can be determined in accordance with DIN 53504:2009-10 using Type S2 dog bones (or barbells), for example. Likewise, the enhanced mechanical property in the Z-direction can exhibit a Young's Modulus from about 30 MPa to about 70 MPa, from about 40 MPa to about 70 MPa, or from about 50 MPa to about 70 MPa, which is in the same relative realm of the values that can be achieved in the XY-direction. Young's Modulus, sometimes referred to as the modulus of elasticity in tension, is a measurement of tensile stiffness, which quantifies the relationship between stress (per force unit area) and axial strain (proportional deformation) at a linear elastic region. To evaluate a three-dimensional printed object, a Type S2 dog bone can be printed using an identical process and materials of that used to prepare the three-dimensional object being evaluated, or if that is not feasible, the three-dimensional object can be used as a source object to cut out a three-dimensional object, including a sample as printed in the Z-direction, if possible, to determine the mechanical properties of the three-dimensional object.

In printing in a layer-by-layer manner, the build material can be spread, the fusing agent applied, the layer of the build material can be exposed to energy, and then the build platform can then be dropped a distance of 5 µm to 1 mm, which can correspond to the thickness of a printed layer of the three-dimensional object, so that another layer of the build material can be added again thereon to receive another application of fusing agent, and so forth. However, as mentioned, layers greater than about 180 µm or greater than about 200 µm can particularly benefit from the post-print thermal treatment described herein. During the build, the radiation absorber in the fusing agent can act to convert the energy to thermal energy and promote the transfer of thermal heat to particles of the build material in contact with the fusing agent including the radiation absorber. In an example, the fusing agent can elevate the temperature of the particles of the build material above the melting or softening point of the particles, thereby allowing fusing (e.g., sintering, binding, curing, etc.) of the build material particles and the formation of an individual layer of the three-dimensional object. The method can be repeated until all the individual build material layers have been created and a three-dimensional object is formed. In some examples, the method can further include thermally treating the build material prior to dispensing.

Three-Dimensional Printed Objects

The three-dimensional printing systems and methods described herein can result in three-dimensional printed objects having mechanical properties that may be suitable in all directions, including the Z-direction (or the direction of layer to layer printing), even when some of the layers may be thicker than about 180 µm, for example. Three-dimensional objects described herein can include multiple fused layers of from about 95 wt % to about 99.9 wt % thermoplastic elastomer and from about 0.1 wt % to about 3 wt % radiation absorber dispersed in the thermoplastic elastomer. A plurality or all of the multiple fused polymer layers can have a thickness from about 180 µm to about 400 µm, and the three-dimensional printed object exhibits a mechanical property in a Z-direction that is within about 50% to about 120% of the mechanical property in the X-direction or Y-direction based on the mechanical property selected from strain at break (%), tensile strength (MPa), or Young's modulus (MPa). The mechanical property, for example, can be provided so that Z-direction exhibits 70% to about 200% strain at break, from about 6 MPa to about 12 MPa tensile strength, from about 30 MPa to about 70 MPa Young's Modulus, or a combination thereof. Other sub-ranges of these mechanical properties can likewise be used, as previously described with respect to the three-dimensional printing systems and methods herein.

This additional mechanical elasticity, rigidity, part strength, and/or other properties described herein can be particularly beneficial when preparing more delicate objects, such as objects with lattices. Lattices are structures that include both portions with positive material as well as negative space where no material is present. Typically lattices may include elongated material lengths that cross one another at nodes, leaving negative space therein surrounded by material, e.g., net-like, basket-like, etc. In one example, the three-dimensional printed object can include a lattice structure having from about a 10% to about a 40% part density by volume, from about 12% to about 30% part density by volume, or from about 15% to about 25% part density by volume. The part density can be determined using the areas where there is lattice, and not other areas where the lattice may not be present, e.g., a frame around a lattice.

Build Materials

The build material can make up the bulk of the three-dimensional printed object. As mentioned, the build material can include from about 95 wt % to 100 wt % thermoplastic elastomer particles. In an example, as used herein, thermoplastic elastomer particles can refer to polymer particles that exhibit both thermoplastic and elastomeric properties. Examples of thermoplastic elastomer particles can include styrenic block copolymer (TPS), thermoplastic polyolefin elastomers (TPO), thermoplastic vulcanizate (TPV), thermoplastic polyurethane (TPU), thermoplastic copolyester (TPC), thermoplastic polyamide (TPA), or a mixture thereof.

In addition to the thermoplastic elastomer particles, the build material may include similarly sized particles or differently sized particles of other types up to an amount of about 5 wt %. The term "size" or "particle size," as used herein, when referring to the build material, including the thermoplastic elastomer particles or other particles that may be present refers to the diameter of a substantially spherical particle, or the effective diameter of a non-spherical particle, e.g., the diameter of a sphere with the same mass and density as the non-spherical particle as determined by weight. A substantially spherical particle, e.g., spherical or near-spherical, can have a sphericity of >0.84. Thus, any individual particles having a sphericity of <0.84 can be considered non-spherical (irregularly shaped). For example, the particles can have a "D50" particle size from about 2 µm to about 150 µm, from about 20 µm to about 100 µm, or from about 25 µm to about 125 µm. "D50" particle size is defined as the particle size at which about half of the particles are larger than the D50 particle size and about half of the other particles are smaller than the D50 particle size (by weight based on the particle content). Particle size can be collected by laser diffraction, microscope imaging, or other suitable methodology, but in some examples, the particle size (or particle size distribution) can be measured and/or characterized using a MASTERSIZER™ or ZETASIZER™, from Malvern Panalytical (United Kingdom), for example.

Examples of other types of particles that may be included up to 5 wt % in aggregate amount can include flow additives, antioxidants, inorganic filler, polymers that are not thermoplastic elastomer particles, or any combination thereof. An example flow additive can include fumed silica. An example antioxidant can include hindered phenols. The inorganic filler can include particles such as alumina, silica, fibers, carbon nanotubes, cellulose, or a combination thereof. In some examples, the filler can become embedded in the polymer, forming a composite material.

The build material can be capable of being printed into three-dimensional objects with a resolution of about 20 µm to about 150 µm, about 30 µm to about 100 µm, or about 40 µm to about 80 µm. As used herein, "resolution" refers to the size of the smallest feature that can be formed on a three-dimensional object. The build material can form layers from about 20 µm to about 150 µm thick, allowing the fused layers of the printed object to have roughly the same thickness. This can provide a resolution in the z-axis (i.e., depth) direction of about 20 µm to about 150 µm. The build material can also have a sufficiently small particle size and sufficiently regular particle shape to provide about 2 µm to about 150 µm resolution along the x-axis and y-axis (i.e., the axes parallel to the top surface of the powder bed).

Fusing Agents

In further detail, regarding the fusing agent that may be utilized in the three-dimensional printing kit, method of three-dimensional (3D) printing, or the three-dimensional printing system, as described herein, the fusing agent can include water and a radiation absorber that can absorb radiation energy and convert the radiation energy to heat. Example radiation absorbers can include, for example, a metal dithiolene complex, carbon black, glass fiber, titanium dioxide, clay, mica, talc, barium sulfate, calcium carbonate, near-infrared absorbing dye, near-infrared absorbing pigment, metal nanoparticles, conjugated polymer, or a combination thereof. The radiation absorber can be colored or colorless.

Examples of near-infrared absorbing dyes can include aminium dyes, tetraaryldiamine dyes, cyanine dyes, pthalocyanine dyes, dithiolene dyes, and others. In further examples, the fusing agent can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2. For example, $M_2P_2O_7$ can include compounds such as $Cu_2P_2O_7$, $Cu/MgP_2O_7$, $Cu/ZnP_2O_7$, or any other suitable combination of counterions. The phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. The silicates described herein are not limited to counterions having a +2 oxidation state. Other silicate counterions can also be used to prepare other suitable near-infrared pigments.

An amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 20 wt %. In another example, the concentration can be from about 0.5 wt % to about 15 wt %. In yet another example, the concentration can be from about 1 wt % to about 10 wt %. In a particular example, the concentration can be from about 0.5 wt % to about 2 wt %. In one specific example, the fusing agent can include from about 60 wt % to about 94 wt % water, from about 5 wt % to about 35 wt % organic co-solvent, and from about 1 wt % to about 20 wt % radiation absorber, based on a total weight of the fusing agent.

A dispersant can be included in some examples. Dispersants can help disperse the radiation absorbers. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly (ethylene glycol) p-isooctyl-phenyl ether, sodium polyacrylate, and combinations thereof.

Other Fluid Agents

In some examples, the three-dimensional printing kit, methods of three-dimensional printing, and/or three-dimensional printing system can include a detailing agent and/or the application thereof, or other fluid agents, such as coloring agents. A detailing agent can include a detailing compound capable of cooling the build material upon application. In some examples, the detailing agent can be printed around the edges of the portion of a build material that is or can be printed with the fusing agent. The detailing agent can increase selectivity between the fused and un-fused portions of the build material by reducing the temperature of the build material around the edge of the portion to be fused.

In some examples, the detailing agent can be a solvent that can evaporate at the temperature of the powder bed. As mentioned above, in some cases the build material in the powder bed can be preheated to a preheat temperature within 10° C. to 70° C. of the fusing temperature of the build material. Thus, the detailing agent can be a solvent that evaporates upon contact with the build material at the preheat temperature, thereby cooling the printed portion through evaporative cooling. In certain examples, the detailing agent can include water, co-solvents, or combinations thereof. In further examples, the detailing agent can be substantially devoid of radiation absorbers. That is, in some examples, the detailing agent can be substantially devoid of ingredients that absorb enough energy from the energy source to cause the build material to fuse. In certain examples, the detailing agent can include colorants such as dyes or pigments, but in small enough amounts such that the colorants do not cause the build material printed with the detailing agent to fuse when exposed to the energy source.

A coloring agent, on the other hand, can be included to add color to the printed three-dimensional object, and thus, can include a liquid vehicle and a colorant, e.g., dye(s) and/or pigments(s). The concentration of colorant in the coloring agent can be, for example, from about 0.5 wt % to about 10 wt %, from about 0.5 wt % to about 8 wt %, or from about 1 wt % to about 10 wt %. The liquid vehicle can include water, organic co-solvent, and in some instances surfactant and/or other additives.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, "dispensing" when referring to fusing agent that may be used, for example, refers to any technology that can be used to put or place the fluid, e.g., fusing agent, on the build material or into a layer of build material for forming a green body object. For example, "dispensing" may refer to "jetting," "ejecting." "dropping." "spraying," or the like. In one example, dispensing may be by digitally ejecting or jetting the fusing agent selectively and iteratively onto the layers of build material.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as up to about 20 picoliters (pL), up to about 30 pL, or up to about 50 pL. Example ranges may include from about 2 pL to about 50 pL, or from about 3 pL to about 12 pL.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

EXAMPLES

The following illustrates examples of the present disclosure. Numerous modifications and alternative compositions, methods, and systems may be devised without departing from the present disclosure. The appended claims are intended to cover such modifications and arrangements.

Example 1—Preparation of Type S2 Dog Bones

Figure 3:
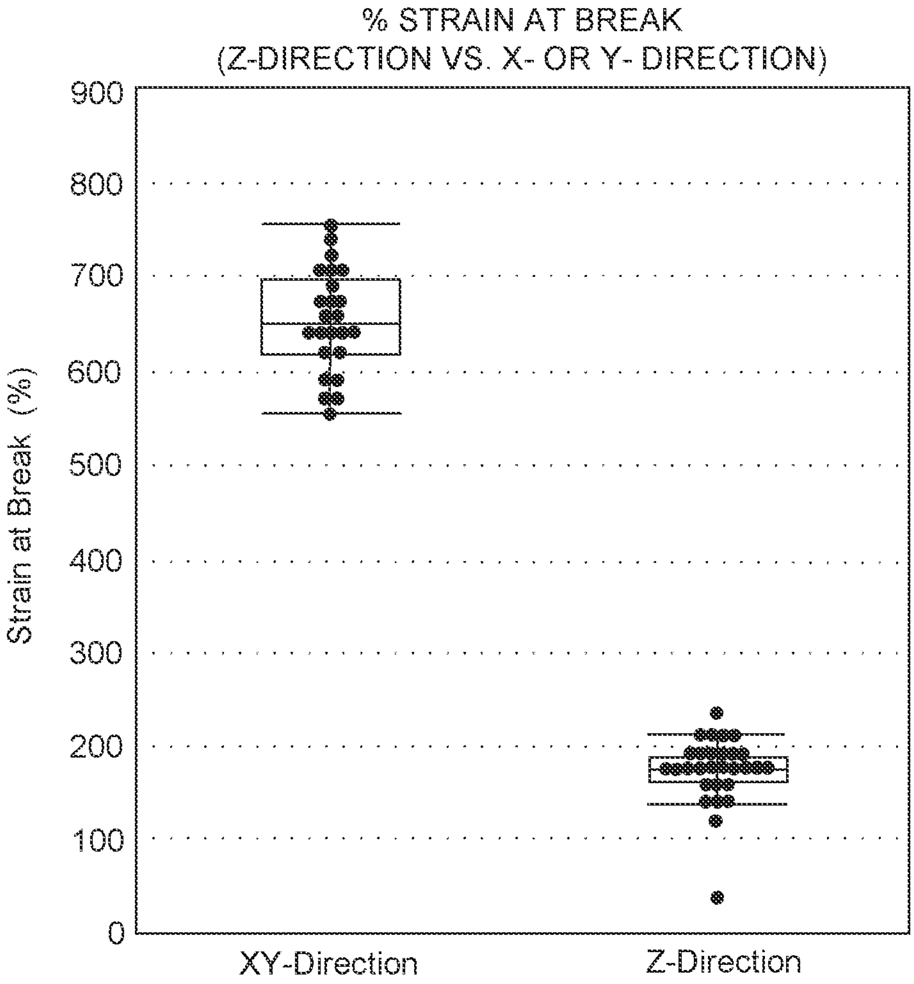
FIG. 3 is a bar graph illustrating the difference between strain at break in the Z-direction relative to the XY-direction without post-print thermal treatment.

Based on data collected as shown in FIG. 3, and other observations with respect to the relative disparity with Z-direction mechanical properties relative to XY-direction mechanical properties, post-print thermal treatment was considered to determine if the Z-direction mechanical properties could be increased to be more similar to mechanical properties more commonly observed in in the XY-direction. Notably, as shown in FIG. 3, it is apparent that strain at break values in the Z-directly are considerably inferior to mechanical properties that can be achieved in the XY-direction using typical printing parameters and thermoplastic elastomers.

Based on this directionally-dependent printing disparity of mechanical properties, to evaluate if there would be a benefit of post-print thermal treatment as described herein, several thermoplastic polyamide dog bonds (Type S2 in accordance with DIN 53504:2009-10) were printed in the Z-direction (see 125B in FIG. 1, showing Z-direction printing—number and thickness of layers, and relative proportions of dog bone not shown to scale) with 200 μm individual layers. The TPA used had a melting temperature from about 130° C. to about 140° C. The fusing agent used included an aqueous liquid vehicle with 5 wt % radiation absorber. The three-dimensional printer used was a 5200 series production printer. The dog bones were split into various categories including a Control (no post-print thermal treatment), Thermal Treatment at 140° C. for 20 hours, Thermal Treatment at 155° C. for 20 hours, and Thermal Treatment for 120° C. at 72 hours. A series of several dog bones were evaluated for each condition, e.g., typically from 3 to 5, and it was observed that anneal temperatures at both 120° C. and 140° C. resulted in substantial increases in mechanical properties, as outlined in the examples below.

Example 2—Strain at Break (%) Comparison

Figure 4:
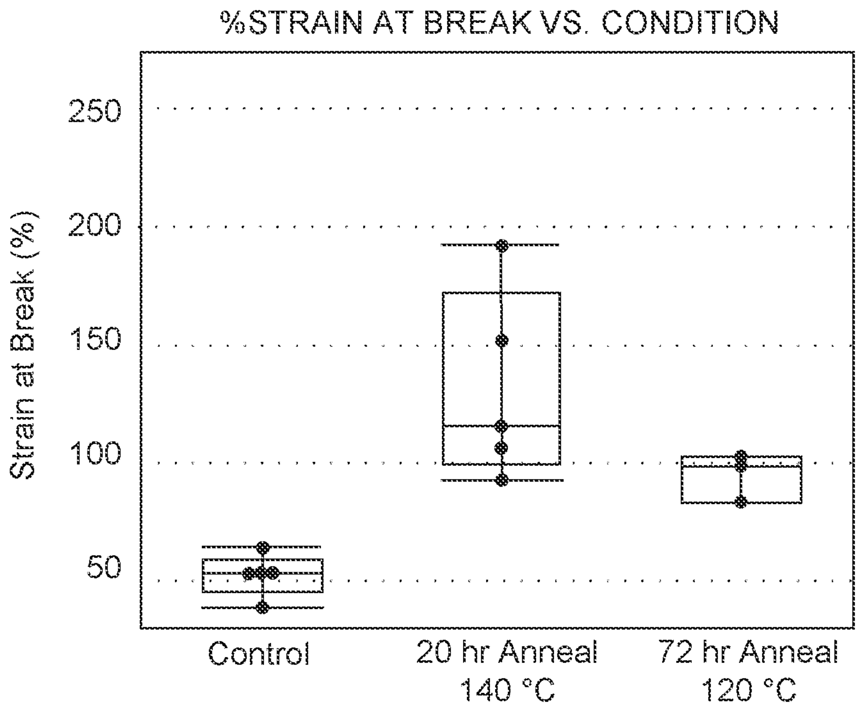
FIG. 4 is a bar graph illustrating improvement of strain at break that can be achieved with post-print thermal treatment in the Z-direction.

A direct comparison of three different types of dog bones were evaluated, namely the Control dog bones were compared to the dog bones prepared using Thermal Treatment at 140° C. for 20 hours and Thermal Treatment for 120° C. at 72 hours. At both temperature/time profiles where thermal treatment occurred after the build, the strain at break (%) was consistently and considerably improved compared to the Control, as shown in FIG. 4.

Example 3—Tensile Strength (MPa) Comparison

Figure 5:
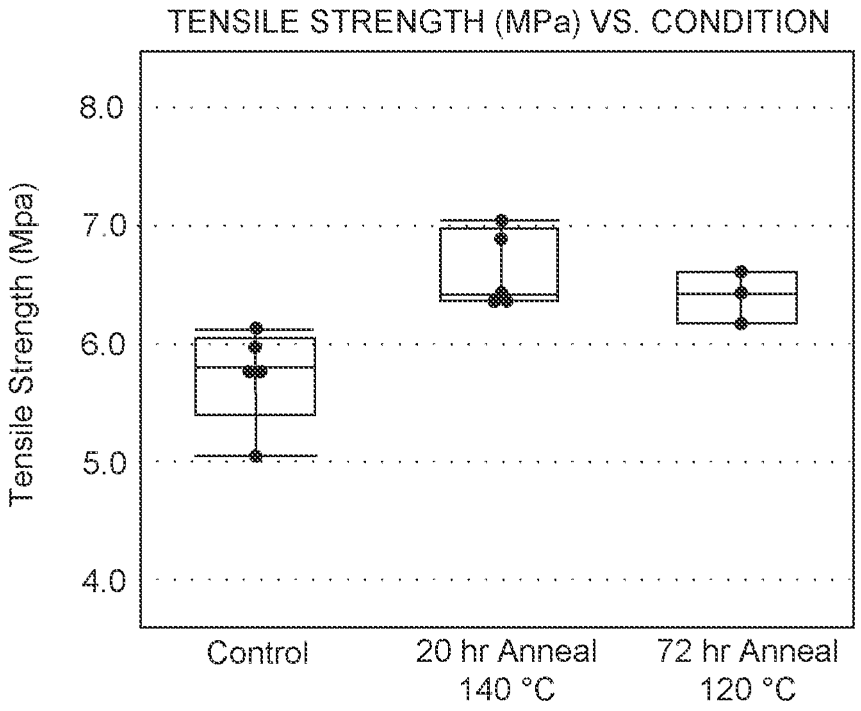
FIG. 5 is a bar graph illustrating improvement of tensile strength that can be achieved with post-print thermal treatment in the Z-direction.

A direct comparison of three different types of dog bones were evaluated, namely the Control dog bones were compared to the dog bones prepared using Thermal Treatment at 140° C. for 20 hours and Thermal Treatment for 120° C. at 72 hours. At both temperature/time profiles where thermal treatment occurred after the build, the Tensile Strength (MPa) was consistently and considerably improved compared to the Control, as shown in FIG. 5.

Example 4—Young's Modulus (MPa) Comparison

Figure 6:
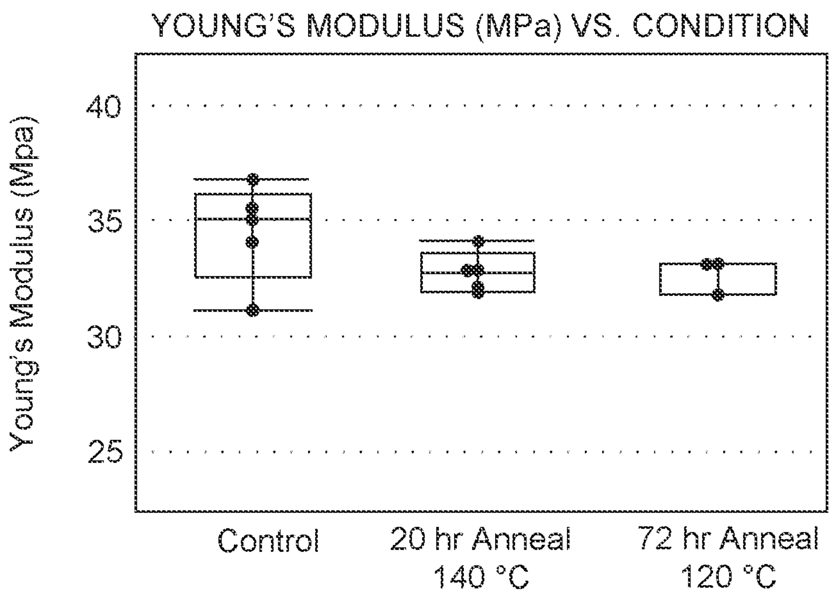
FIG. 6 is a bar graph illustrating improvement of Young's Modulus that can be achieved with post-print thermal treatment in the Z-direction.

A direct comparison of three different types of dog bones were evaluated, namely the Control dog bones were compared to the dog bones prepared using Thermal Treatment at 140° C. for 20 hours and Thermal Treatment for 120° C. at 72 hours. At both temperature/time profiles where thermal treatment occurred after the build, the Young's Modulus (MPa) was consistently and considerably improved compared to the Control, as shown in FIG. 6.

Example 5—Strain at Break, Tensile Strength, and Young's Modulus Comparison

Figure 7:
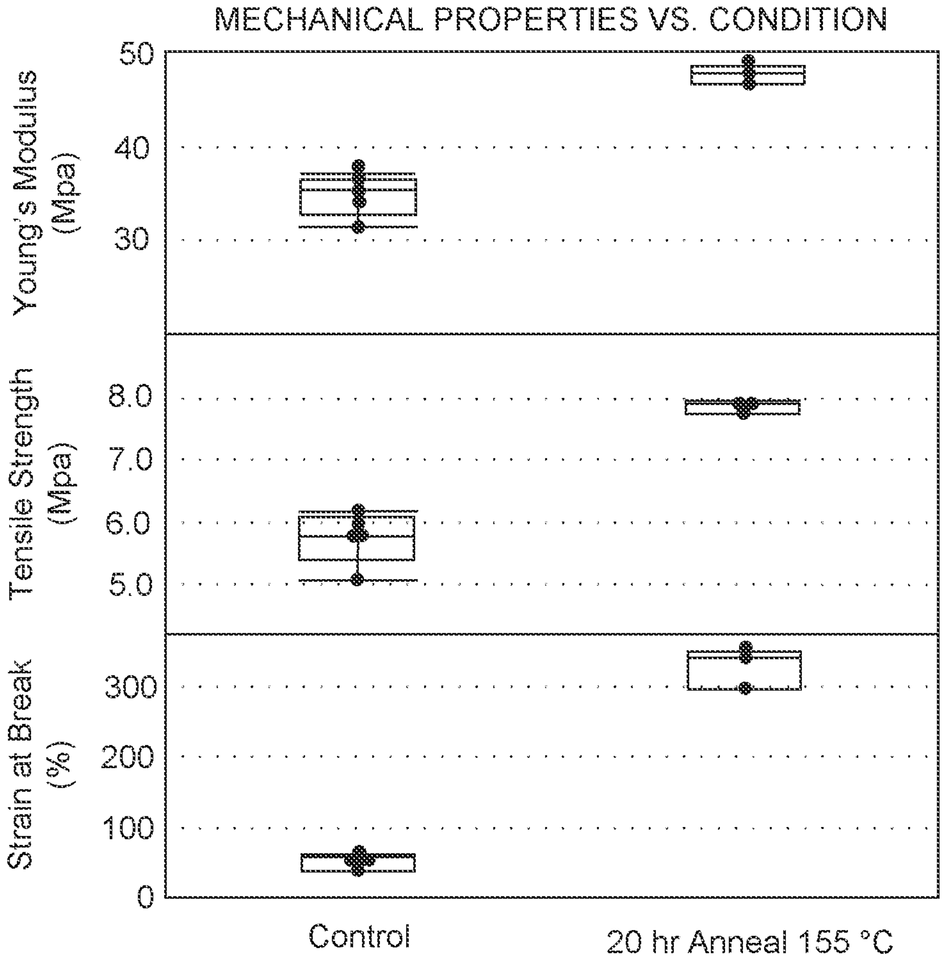
FIG. 7 is a bar graph illustrating improvement of strain at break, tensile strength, and Young's Modulus that can be achieved with post-print thermal treatment in the Z-direction.

A direct comparison of two different types of dog bones were evaluated over all three mechanical property tests, namely the Control dog bones were compared to the dog bones prepared using Thermal Treatment at 155° C. for 20 hours. At the temperature/time profile where thermal treatment occurred after the build, all three mechanical properties were consistently and considerably improved compared to the Control, as shown in FIG. 7.

Example 6—Additional Strain at Break (%) Comparison

Figure 8:
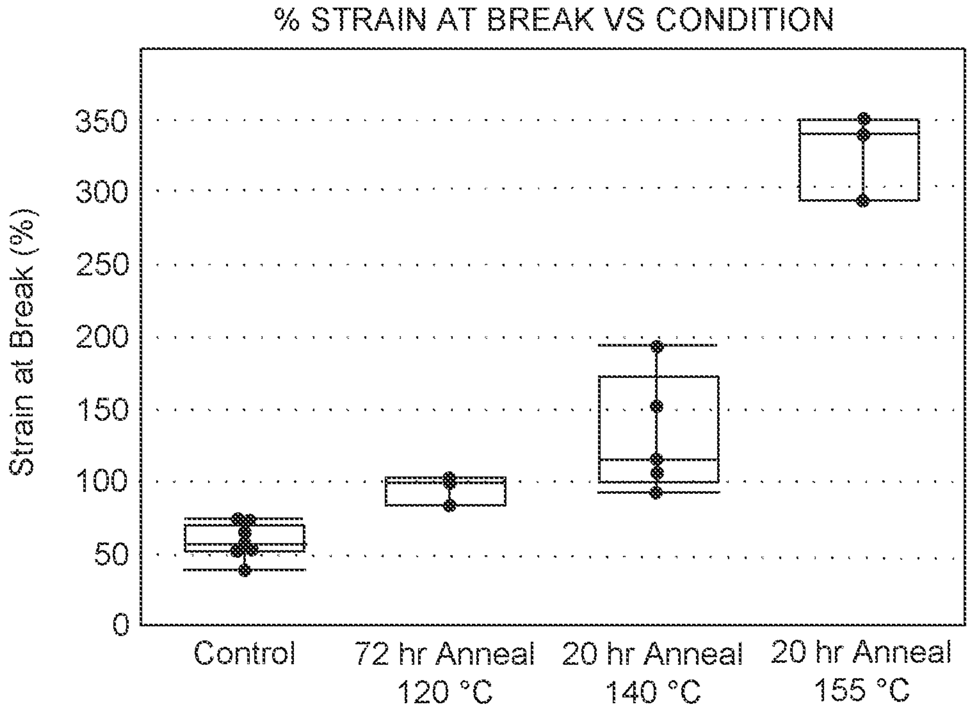
FIG. 8 is a bar graph illustrating improvement of strain at break under multiple conditions that can be achieved with post-print thermal treatment in the Z-direction.

A direct comparison of all four different types of dog bones were evaluated, namely the Control dog bones were compared to the dog bones prepared using Thermal Treatment at 140° C. for 20 hours, Thermal Treatment at 155° C. for 20 hours, and Thermal Treatment for 120° C. at 72 hours. At all three temperature/time profiles where thermal treatment occurred after the build, the strain at break (%) was consistently and considerably improved compared to the Control, as shown in FIG. 8.

As can be seen in Examples 2-6, to the elongation at break, the tensile at break, and the Young's Modulus were all enhanced or increased in the Z-direction, in some cases even approaching the strength normally anticipated when testing mechanical properties in the XY-direction. These mechanical properties in the Z-direction when the layers are printed with relatively thick layer thicknesses, e.g., about 200 μm in these examples, can be achieved when it appears to be challenging to do so without post-print thermal treatment, e.g., annealing. It was also observed in every example that there was little change to overall stiffness, which can be especially desirable for applications such as footwear parts with lattice structures. As mentioned, the TPA used had a melt temperature of about 130° C. to about 140° C., and so it was surprising to discover that a temperature of 155° C. (which is higher than the melt temperature) provided acceptably improved results without deformation of the thermoplastic object. There was no noticeable structural deformation, melting, or structural integrity issues observed.

What is claimed is:

1. A method of three-dimensional printing comprising:

iteratively applying individual build material layers of a build material including from about 95 wt % to 100 wt % of thermoplastic elastomer particles having a D50 particle size ranging from about 2 μm to about 150 μm;

based on a 3D object model, iteratively and selectively dispensing a fusing agent onto individual build material layers, wherein the fusing agent comprises water and a radiation absorber;

iteratively exposing a powder bed to energy to selectively fuse the thermoplastic elastomer particles in contact with the radiation absorber and form a fused polymer matrix at the individual build material layers resulting in a fused three-dimensional object; and thermally treating the fused three-dimensional object to a temperature at or within +40° C. of a melting point of the thermoplastic elastomer particles for a time period ranging from about 5 minutes to about 48 hours, thereby enhancing the fusion between adjacent build material layers at an interior location of the three-dimensional object without structural deformation of the three-dimensional object;

wherein the melting point of the thermoplastic elastomer particles ranges from 130° C. to about 140° C., wherein the temperature is 155° C., and wherein the time period is 20 hours.

2. The method as defined in claim 1, wherein the thermoplastic elastomer particles are a thermoplastic polyamide.

3. The method as defined in claim 1, wherein the fused three-dimensional object exhibits Young's Modulus between 45 MPa and 50 MPa; tensile strength between 7.8 MPa and 8 MPa; and strain at break between 300% and 400%.

4. The method of claim 1, wherein the thermoplastic elastomer particles include thermoplastic polyolefin elastomers (TPO).

5. The method of claim 1, wherein the fused three-dimensional object after thermally treating compared to the fused three-dimensional object prior to thermally treating has an enhanced layer-to-layer mechanical property in the Z-direction.

6. The method of claim 1, wherein applying the individual build material layers includes applying a plurality or all of the individual build material layers of the thermoplastic elastomer particles at a layer thickness from about 180 μm to about 400 μm.

* * * * *